United States Patent

Chiang

[11] Patent Number: 6,119,821
[45] Date of Patent: Sep. 19, 2000

[54] HYDRAULIC COMPENSATION DEVICE FOR COMPENSATING A POSITIONAL DEVIATION OF A BRAKE PAD

[75] Inventor: Hai-Huan Chiang, Tao-Yuan Hsien, Taiwan

[73] Assignee: Giant Manufacturing Co., Ltd., Taichung Hsien, Taiwan

[21] Appl. No.: 09/219,009

[22] Filed: Dec. 23, 1998

[51] Int. Cl.[7] .................................................. F16D 55/02
[52] U.S. Cl. .................................. 188/71.7; 188/1.11 W; 188/24.19; 188/351
[58] Field of Search ............................... 188/71.7, 24.19, 188/24.22, 71.9, 72.4, 344, 351, 79.51, 79.56, 79.57, 1.11 R, 1.11 W

[56] References Cited

U.S. PATENT DOCUMENTS

| | | | |
|---|---|---|---|
| 4,192,405 | 3/1980 | Lee et al. | 188/72.6 |
| 4,279,214 | 7/1981 | Thorn | 188/1.11 W |
| 5,358,078 | 10/1994 | Gajek et al. | 188/72.4 |
| 5,813,501 | 9/1998 | Terry, Sr. | 188/24.22 X |

*Primary Examiner*—Robert J. Oberleitner
*Assistant Examiner*—Melanie Talavera
*Attorney, Agent, or Firm*—Harness, Dickey & Pierce, P.L.C.

[57] ABSTRACT

A hydraulic compensation device includes a container, a piston, a push member and an indicating rod. The piston is mounted slidably inside the container adjacent to a first end portion to confine a brake oil with the first end portion of the container. The push member is disposed rotatably inside the container adjacent to a second end portion that is opposite to the first end portion of the container, and abuts against the piston. The push member is threadedly movable relative to the container so as to push the piston toward the first end portion, thereby moving the hydraulic actuator and adjusting the position of the brake pad. The indicating rod projects axially from the push member, and extends outwardly of the container through the second end portion of the container for indicating the amount of displacement of the push member. Screw thread members are provided on the container and the push member to permit the push member to threadedly move relative to the container for adjustment of the position of the piston.

9 Claims, 8 Drawing Sheets

HYDRAULIC COMPENSATION DEVICE FOR COMPENSATING A POSITIONAL DEVIATION OF A BRAKE PAD

BACKGROUND OF THE INVENTION

1. Field of the Invention

This invention relates to a hydraulic compensation device for compensating a positional deviation of a brake pad, more particularly to a hydraulic compensation device, which has an indicating rod for indicating the amount of the positional deviation of the brake pad.

2. Description of the Related Art

Referring to FIGS. 1 and 2, a conventional hydraulic compensation device is shown to comprise a container 1, a piston 2, a push member 3, a cap 4 and an operating knob member 5. The conventional hydraulic compensation device is adapted for compensating a positional deviation of a brake pad (not shown) which is wearable due to its braking action and which, in use, is mounted on and which is controlled by a hydraulic actuator (not shown).

The container 1 is mounted on a brake line 6 and is adapted to receive brake oil 102 to be supplied to the hydraulic actuator via the brake line 6. The container 1 is communicated with the brake line 6 and the hydraulic actuator. The piston 2 is mounted slidably inside the container 1, and has an O-ring 200 provided thereon in order to confine the brake oil 102 with the container 1. The push member 3 is disposed rotatably inside the container 1, and abuts against the piston 2. The push member 3 is movable threadedly to push the piston 2 toward one end portion of the container 1, thereby moving the hydraulic actuator and adjusting the position of the brake pad. The cap 4 has a tubular wall 401 having an externally threaded surface 403 that engages an internally threaded surface 101 of the container 1 outwardly of the push member 3, and an internally threaded surface 402 that engages an externally threaded surface 301 of the push member 3. The operating knob member 5 is mounted rotatably on the cap 4, and has two elongated ribs 504 that extend through the cap 4 and that engage the push member 3. Therefore, the push member 3 can be rotated by the operating knob member 5 to move the piston 2 toward one end portion of the container 1, thereby adjusting the position of the brake pad. However, the user is unable to know the exact extent of wearing of the brake pad during adjustment with the use of the conventional hydraulic compensation device.

SUMMARY OF THE INVENTION

The object of the present invention is to provide a hydraulic compensation device that can enable the user to know the exact extent of wearing of the brake pad while the position of the brake pad is being adjusted by means of the hydraulic compensation device.

According to the present invention, the hydraulic compensation device comprises:

a container adapted to receive a brake oil to be supplied to a hydraulic actuator, the container having a first end portion formed with an oil passage adapted to be communicated with the hydraulic actuator, and a second end portion opposite to the first end portion;

a piston slidably mounted inside the container adjacent to the first end portion to confine the brake oil with the first end portion;

a push member rotatably disposed inside the container at one side of the piston adjacent to the second end portion of the container and abutting against the piston, the push member being threadedly movable relative to the container so as to push the piston toward the first end portion, thereby moving the hydraulic actuator and adjusting the position of the brake pad;

an indicating rod integral with and projecting axially from the push member and extending outwardly of the container through the second end portion of the container for indicating the amount of displacement of the push member; and screw thread means provided on the container and the push member to permit the push member to threadedly move relative to the container for adjustment of the position of the piston.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
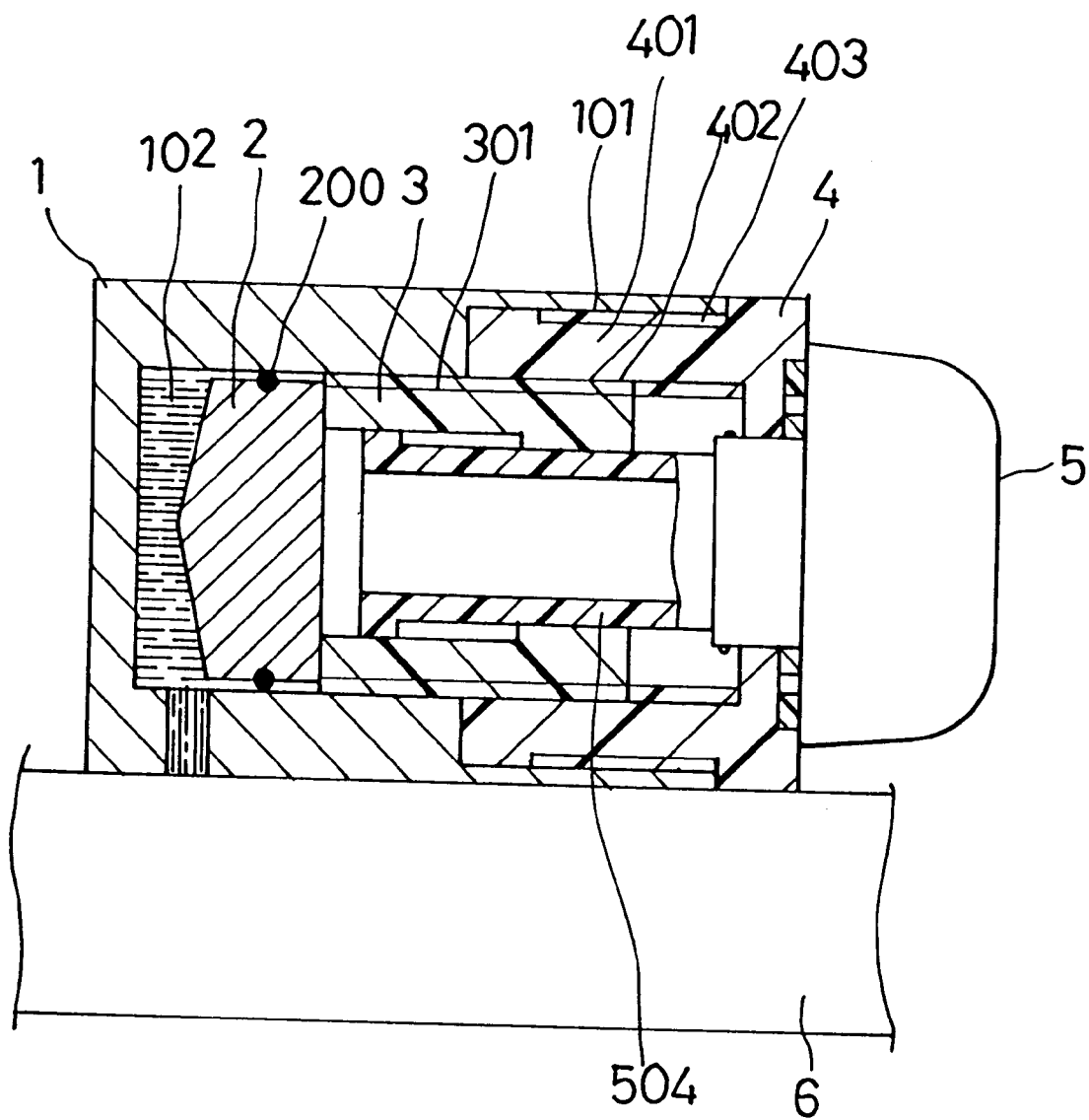
FIG. 1 is a longitudinal sectional view of a conventional hydraulic compensation device.
Figure 2:
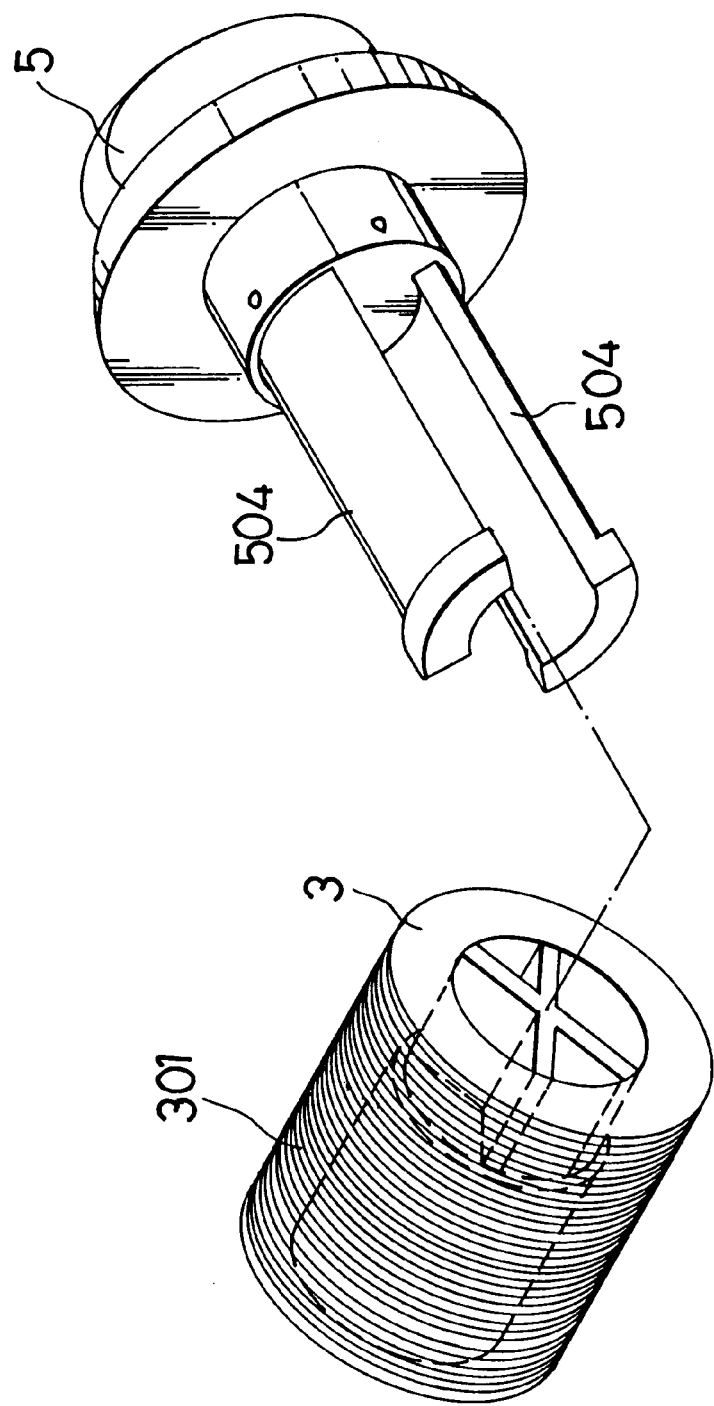
FIG. 2 is an exploded view of an operation knob member and a push member of the conventional hydraulic compensation device of FIG. 1.
Figure 3:
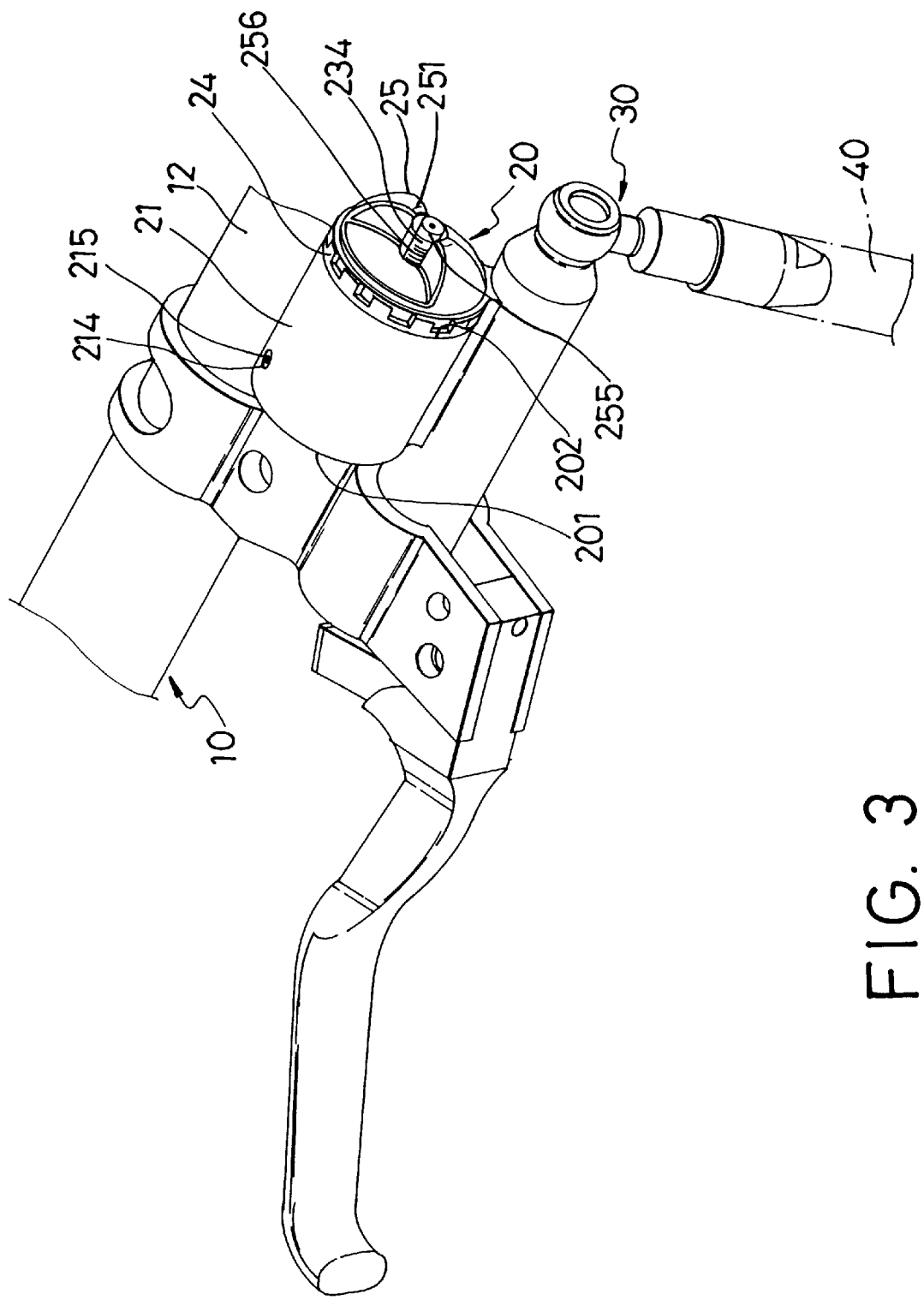
FIG. 3 is a perspective view of a preferred embodiment of a hydraulic compensation device according to the present invention, in which the hydraulic compensation device is mounted on a handlebar of a bicycle.
Figure 4:
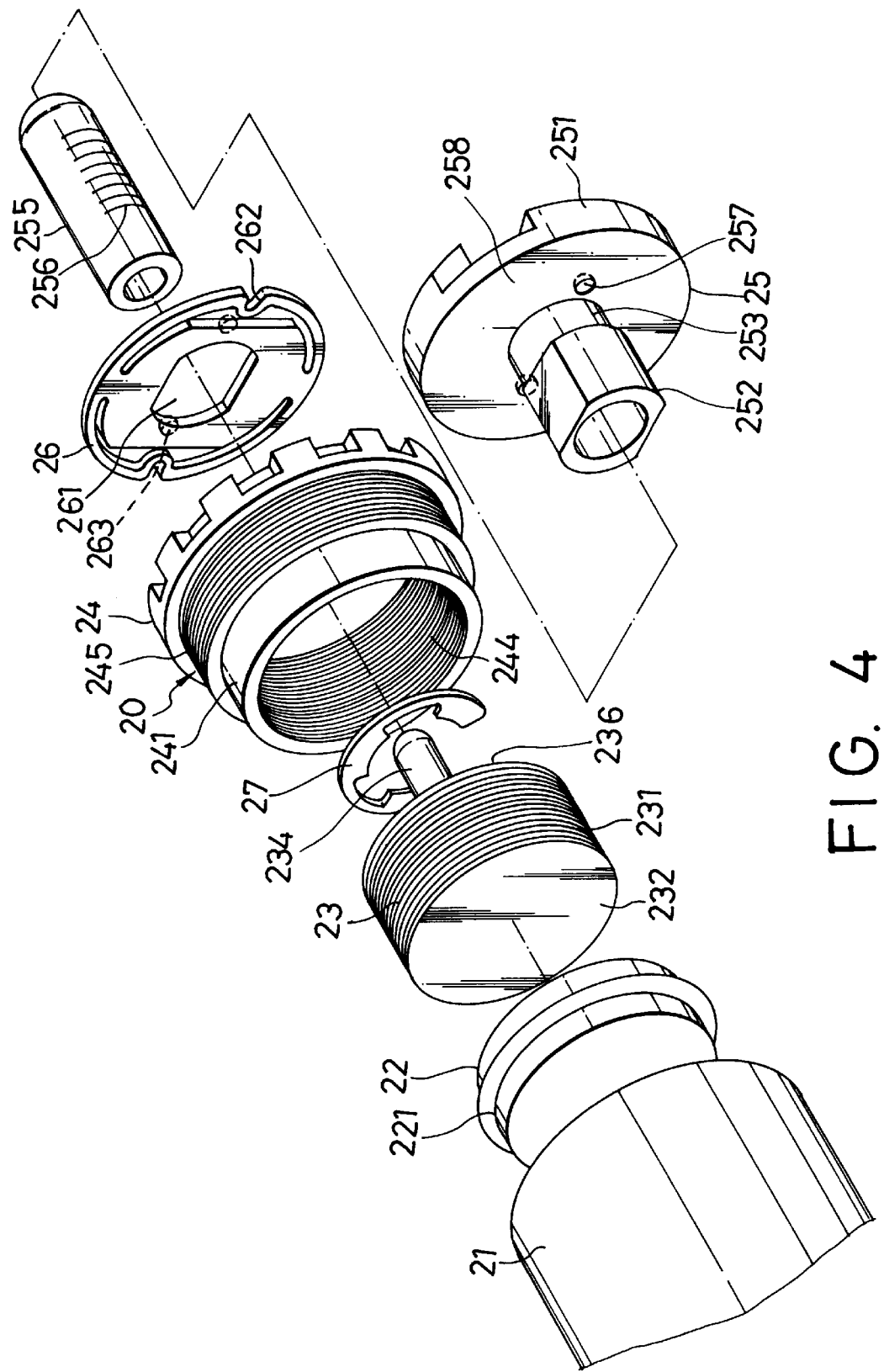
FIG. 4 is an exploded perspective view of the preferred embodiment
Figure 8:
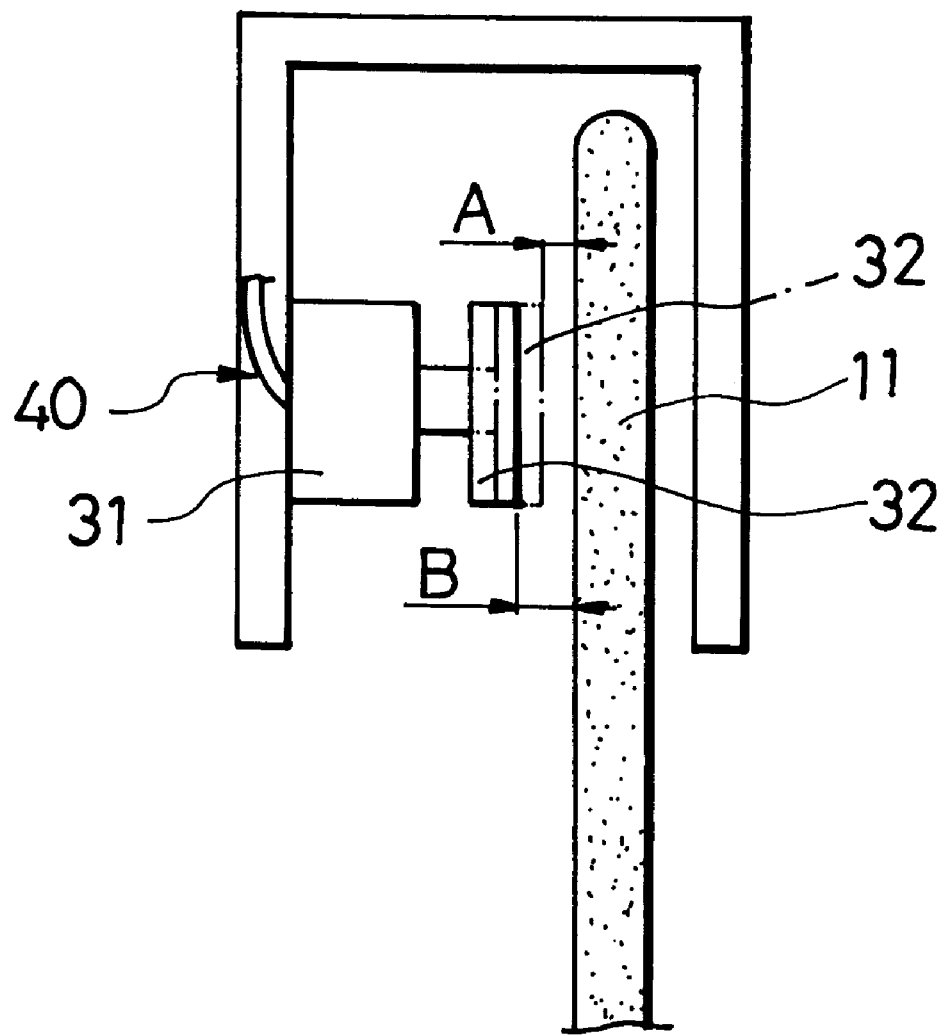
FIG. 8 is a schematic view illustrating how the brake pad is moved by a hydraulic actuator that is actuated by the hydraulic compensation device of the present invention.

Referring to FIGS. 3 and 4, a preferred embodiment of a hydraulic compensation device 20 according to the present invention is shown to comprise a container 21, a piston 22, a push member 23, a cap 24 and an operating knob member 25. The hydraulic compensation device 20 is employed for compensating a positional deviation of a brake pad 32 which is wearable due to its braking action and which, in use, is mounted on and controlled by a hydraulic actuator 31, as shown in FIG. 8.

Figure 5:
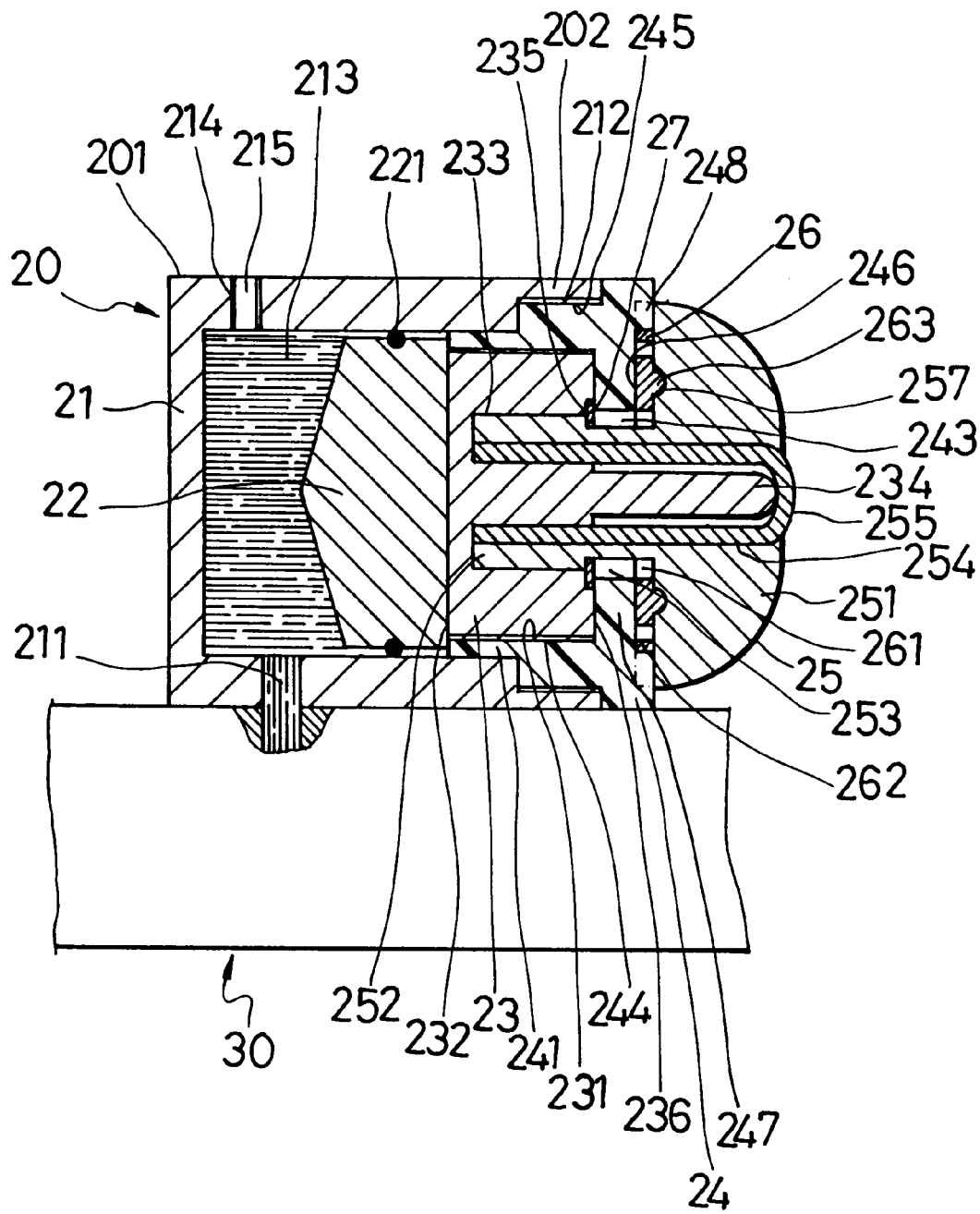
FIG. 5 is a longitudinal sectional view of the preferred embodiment of the hydraulic compensation device according to the present invention.

Referring also to FIG. 5, the container 21 is fixed on a brake line unit 30 that is, in turn, fixed to a handlebar 10 of a bicycle. The container 21 is cylindrical with opposite first and second end portions 201, 202. The first end portion 201 is formed with an oil passage 211 in order to be communicated with a hydraulic actuator 31 via a brake line 40 of the brake line unit 30 (FIG. 8). The container 21 receives a brake oil 213 to be supplied to the hydraulic actuator 31. The container 21 further has an oil supplying threaded hole 214 having a screw 215 engaged therein.

The piston 22 has an O-ring 221 provided thereon and is mounted slidably inside the container 21 adjacent to the first end portion 201 to confine the brake oil 213 with the first end portion 201 of the container 21.

The push member 23 is disposed rotatably inside the container 21 at one side of the piston 22 adjacent to the second end portion 202 of the container 21. The push member 23 has an externally threaded cylindrical surface 231, a first end face 232 that abuts against the piston 22, and a looped groove 233 with a multi-sided cross-section formed in a second end face 236 opposite to the first end face 232. An indicating rod 234 is formed integrally with and projects axially from a central portion of the bottom of the looped groove 233. The indicating rod 234 extends outwardly from the push member 23, and the looped groove 233 is located around a portion of the indicating rod 234. An inner shoulder 235 is formed in the looped groove 233 at the second end face of the push member 23.

The cap 24 has a tubular wall 241 that is formed with an internally threaded cylindrical surface 244 and an externally threaded section 245. The externally threaded section 245 engages threadedly an internal thread formed in an inner wall surface of the second end portion 202 of the container 21 so as to be mounted fixedly to the second end portion 202 outwardly of the push member 23. The internally threaded cylindrical surface 244 of the cap 24 engages threadedly the externally threaded cylindrical surface 231 of the push member 23 to permit the push member 23 to move threadedly relative to the container 21 for adjustment of the position of the piston 22. The tubular wall 241 has an end flange 247 which projects radially and inwardly from the tubular wall 241 outwardly of the push member 23. The end flange 247 has two diametrically opposed chamfered projections 248 formed thereon.

The operating knob member 25 is mounted rotatably on the second end portion 202 of the container 21 outwardly of the end flange 247 of the cap 24, and is connected to the push member 23 for rotating the push member 23. More specifically, the operating knob member 25 has a rotary disk portion 251 and a tubular portion 252. The tubular portion 252 extends through the end flange 247 into the looped groove 233. The tubular portion 252 has a complementary multi-sided cross-section that engages the multi-sided cross-section of the looped groove 233 of the push member 23. The tubular portion 252 further has a cylindrical diameter-reduced section 253 that is formed adjacent to the rotary disk portion 251. A C-shaped retaining ring 27 is mounted on the diameter-reduced section 253, and is clamped by and between the inner shoulder 235 of the push member 23 and the end flange 247 to prevent the operating knob member 25 from being pulled out from the second end portion 202 of the container 21. A transparent sleeve 255 with graduations 256 extends through and engages the operating knob member 25. The graduated sleeve 255 has an end portion that extends into the looped groove 233 around the indicating rod 234 in such a manner that the indicating rod 234 is sleeved by and is slidable relative to the graduated sleeve 255. The operating knob member 25 further has an annular shoulder face 258 that is connected to the diameter-reduced section 253 and that confronts with and extends outwardly of the end flange 247. Two depressions 257 are formed on the annular shoulder face 258.

Figure 6:
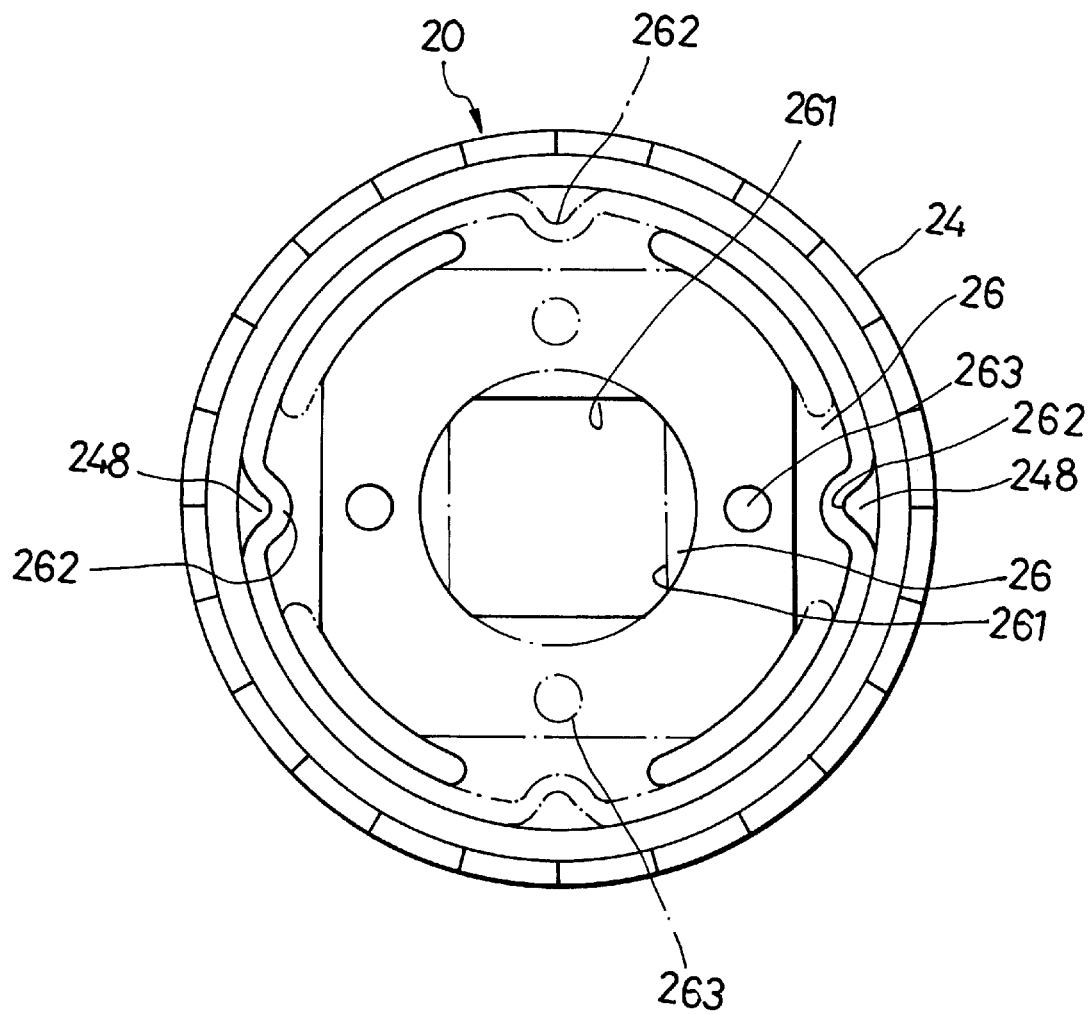
FIG. 6 is a side view of the preferred embodiment of the hydraulic compensation device according to the present invention.

A retraining disc 26 is provided between the end flange 247 of the cap 24 and the annular shoulder face 258. The retraining disc 26 has a central hole 261 through which the tubular portion 252 extends, and two opposing resilient parts with notches 262 that engage projections 248 on the end flange 247 to engage resiliently the end flange 247 of the cap 24, as best illustrated in FIG. 6. The retraining disc 26 further has two protrusions 263 that are offset from the center thereof and that engage the depressions 257 of the operating knob member 25 to interlock the retraining disc 26 and the operating knob member 25.

The operation of the hydraulic compensation device of the present invention will be described hereinbelow.

Figure 7:
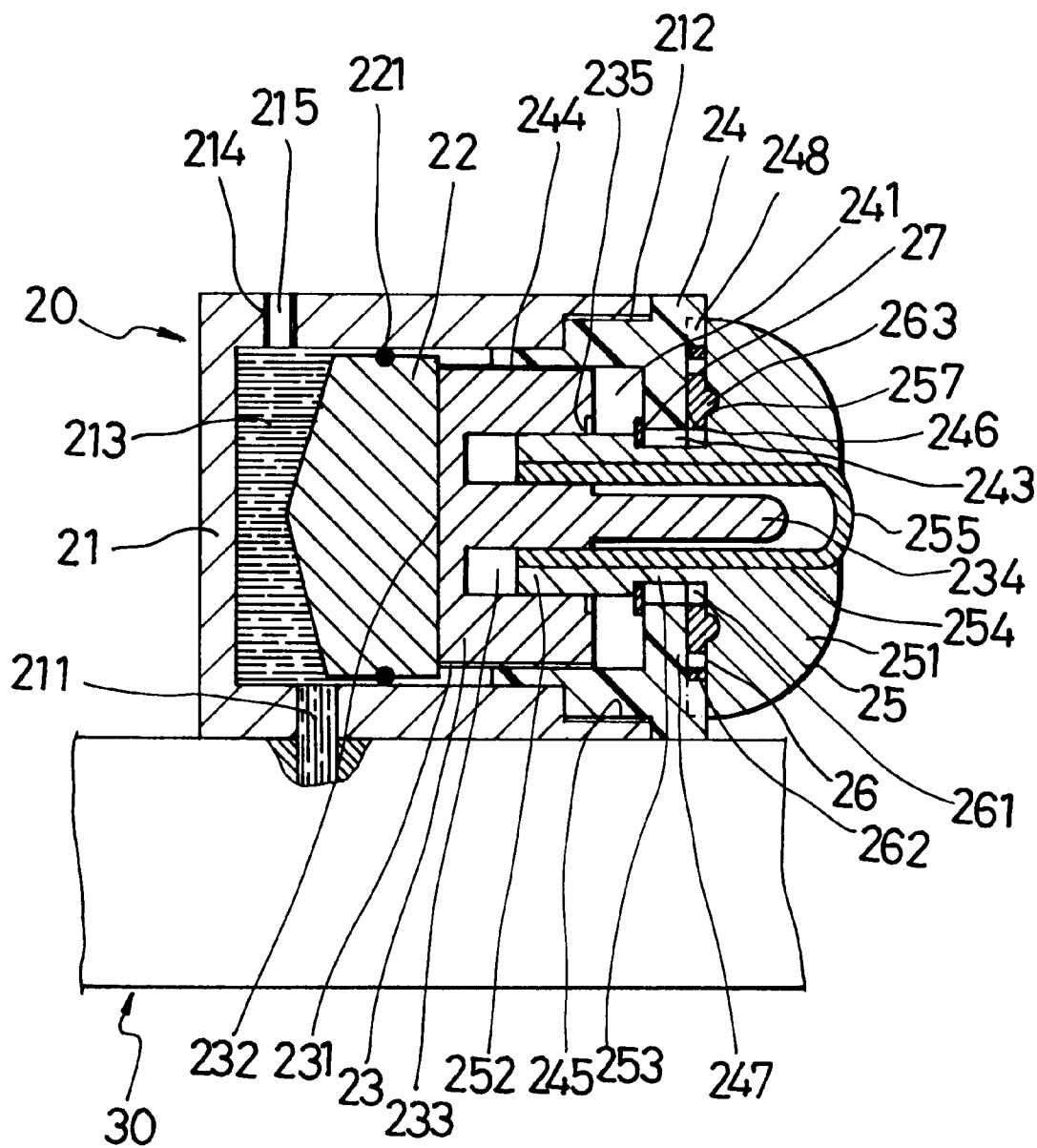
FIG. 7 is a sectional schematic view illustrating how the preferred embodiment is operated.

Referring to FIG. 8, when the distance between the brake pad 32 and the bicycle wheel 11 is increased from (A) to (B) due to the wearing of the brake pad 32, the user may rotate the operating knob member 25 to drive the push member 23 to rotate and move toward the first end portion 201 of the container 21, thereby pushing the piston 22 to move toward the first end portion 201, as best illustrated in FIG. 7. At this time, the brake oil 213 is forced into the brake line 40 to move the hydraulic actuator 31 and, therefore, the brake pad 32 toward the wheel 11 in order to compensate the positional deviation of the brake pad 32. Meanwhile, the indicating rod 234 is moved with the push member 23 relative to the graduated sleeve 255 for indicating the amount of displacement of the push member 23, i.e. the amount of displacement of the brake pad 32. Therefore, the user is able to know the exact extent of wearing of the brake pad 32 by viewing the position of the indicating rod 234 in the graduated sleeve 255 or the graduations 256 on the sleeve 255 to which the distal end of the indicating rod 234 corresponds. In this way, the user can know when to replace an almost worn-out brake pad 32 with a new one by viewing the indicating rod 234.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. A hydraulic compensation device for compensating a positional deviation of a brake pad which is wearable due to its braking action and which, in use, is mounted on and controlled by a hydraulic actuator, the hydraulic compensation device comprising:

a container adapted to receive a brake oil to be supplied to the hydraulic actuator, said container having a first end portion formed with an oil passage adapted to be communicated with the hydraulic actuator, and a second end portion opposite to said first end portion;

a piston slidably mounted inside said container adjacent to said first end portion to confine the brake oil with said first end portion;

a push member rotatably disposed inside said container at one side of said piston adjacent to said second end portion of said container and abutting against said piston, said push member being threadedly movable relative to said container so as to push said piston toward said first end portion, thereby moving the hydraulic actuator and adjusting the position of the brake pad;

an indicating rod integral with and projecting axially from said push member and extending outwardly of said container through said second end portion of said container for indicating amount of displacement of said push member; and screw thread means provided on said container and said push member to permit said push member to threadedly move relative to said container for adjustment of the position of said piston.

2. The hydraulic compensation device as claimed in claim 1, wherein said screw thread means includes an externally threaded cylindrical surface formed on said push member, said container further having an inner wall surface in said second end portion, and a cap fixedly mounted on said second end portion outwardly of said push member, said cap having a tubular wall abutting against said inner wall surface of said second end portion, said tubular wall having an end flange which projects radially and inwardly from said tubular wall outwardly of said push member, said screw thread means further including an internally threaded cylindrical surface on said tubular wall to threadedly engage the externally threaded cylindrical surface, said indicating rod extending outward through said end flange.

3. The hydraulic compensation device as claimed in claim 2, further comprising an operating knob member mounted rotatably on said second end portion of said container outwardly of said end flange of said cap and connected to said push member for rotating said push member.

4. The hydraulic compensation device as claimed in claim 3, further comprising a transparent graduated sleeve which is provided around said indicating rod and which is fixed to said operating knob member, said indicating rod being slidable relative to said graduated sleeve.

5. The hydraulic compensation device as claimed in claim 4, wherein said indicating rod projects from a central portion of said push member, said push member further having a looped groove around a portion of said indicating rod, said graduated sleeve having an end portion extending into said looped groove, said operating knob member further having a tubular portion to extend through said end flange into said looped groove so as to sleeve around and engage said graduated sleeve, and an annular shoulder face which is connected to said tubular portion of said operating knob member and which confronts with and extends outwardly of said end flange of said cap.

6. The hydraulic compensation device as claimed in claim 5, wherein said tubular portion of said operating knob member has a multi-sided cross-section, said looped groove of said push member being provided with a multi-sided cross-section for engagement with said tubular portion of said operating knob member.

7. The hydraulic compensation device as claimed in claim 6, further comprising a retraining disc provided between said end flange of said cap and said annular shoulder face of said operating knob member, said retraining disc having resilient engaging means to resiliently engage said end flange of said cap, and locking means to interlock with said annular shoulder face of said operating knob member.

8. The hydraulic compensation device as claimed in claim 7, wherein said resilient engaging means includes two diametrically opposing resilient parts formed on said retraining disc and notches formed in said resilient parts, said end flange further having two diametrically opposed projections to engage said notches.

9. The hydraulic compensation device as claimed in claim 8, wherein said locking means includes protrusions formed on said retraining disc offset from a center of said retraining disc, said annular shoulder face of said operating knob member further having depressions to interlock with said protrusions.

* * * * *